United States Patent [19]

Demmin et al.

[11] Patent Number: 5,561,171
[45] Date of Patent: * Oct. 1, 1996

[54] CATALYSTS WHICH STABILIZE HYDROHALOCARBON BLOWING AGENT IN POLYISOCYANURATE FOAM FORMULATIONS DURING POLYMERIZATION

[75] Inventors: Timothy R. Demmin, Grand Island; Robert C. Parker, Hamburg; Richard E. Eibeck, Orchard Park; Gary M. Knopeck, Lakeview; Donna M. Ruszaj, E. Amherst, all of N.Y.

[73] Assignee: AlliedSignal, Inc., Morris County, N.J.

[*] Notice: The portion of the term of this patent subsequent to Jun. 7, 2015, has been disclaimed.

[21] Appl. No.: 344,202

[22] Filed: Nov. 23, 1994

Related U.S. Application Data

[60] Division of Ser. No. 752,295, Aug. 30, 1991, Pat. No. 5,395,859, which is a continuation-in-part of Ser. No. 718,528, Jun. 21, 1991, abandoned.

[51] Int. Cl.[6] .............................. C08J 9/14; C08K 5/02; C08K 5/10; C08K 5/19
[52] U.S. Cl. .............. 521/118; 252/182.2; 252/182.24; 252/182.27; 252/182.28; 521/115; 521/116; 521/128; 521/129; 521/130; 521/131; 521/170; 521/902
[58] Field of Search .................... 252/182.2, 182.24, 252/182.27, 182.28; 521/115, 116, 118, 128, 129, 130, 131, 170, 902

[56] References Cited

U.S. PATENT DOCUMENTS

| | | | |
|---|---|---|---|
| 2,993,870 | 7/1961 | Burkus ................................ | 521/902 |
| 3,988,337 | 10/1976 | Narayan et al. ..................... | 521/118 |
| 4,025,469 | 5/1977 | Kauffman ............................ | 521/902 |
| 4,026,836 | 5/1977 | Zimmerman et al. ............... | 521/902 |
| 4,026,837 | 5/1977 | Zimmerman et al. ............... | 521/902 |
| 4,046,721 | 9/1977 | Austin et al. ........................ | 52/902 |
| 4,055,522 | 10/1977 | Ashida et al. ....................... | 521/159 |
| 4,066,580 | 1/1978 | Falkenstein et al. ................ | 521/129 |
| 4,067,833 | 1/1978 | Austin et al. ........................ | 521/902 |
| 4,101,465 | 7/1978 | Lockwood et al. ................. | 521/118 |
| 4,129,693 | 12/1978 | Cenker et al. ....................... | 521/129 |
| 4,136,240 | 1/1979 | Zimmerman et al. ............... | 521/902 |
| 4,165,414 | 8/1979 | Narayan et al ...................... | 521/902 |
| 4,186,255 | 1/1980 | Klein et al. .......................... | 521/128 |
| 4,228,310 | 10/1980 | Speranza ............................. | 521/155 |
| 4,256,846 | 3/1981 | Ohashi et al. ....................... | 521/902 |
| 4,310,633 | 1/1982 | Haas et al. ........................... | 521/121 |
| 4,349,638 | 9/1982 | Narayan .............................. | 521/902 |
| 4,393,015 | 7/1983 | Kaneda et al. ...................... | 521/902 |
| 4,514,525 | 4/1985 | Ashida et al. ....................... | 521/902 |
| 4,526,908 | 7/1985 | Magnus et al. ..................... | 521/172 |
| 4,582,861 | 4/1986 | Galla et al. .......................... | 521/118 |
| 4,607,064 | 8/1986 | Kuhn et al. .......................... | 521/902 |
| 4,636,530 | 1/1987 | Narayan .............................. | 521/902 |
| 4,661,529 | 4/1987 | Kuhn et al. .......................... | 521/902 |
| 4,861,926 | 8/1989 | Servais ................................ | 570/110 |
| 4,898,893 | 2/1990 | Ashida ................................ | 521/131 |
| 4,997,706 | 3/1991 | Smits et al. ......................... | 521/131 |
| 5,001,164 | 3/1991 | Smits et al. ......................... | 521/131 |
| 5,102,918 | 4/1992 | Moriya ................................ | 521/159 |
| 5,137,929 | 8/1992 | Demmin et al. .................... | 521/99 |
| 5,308,883 | 5/1994 | Londrigan et al. ................. | 521/125 |
| 5,405,884 | 4/1995 | Londrigan et al. ................. | 521/125 |
| 5,470,889 | 11/1995 | Londrigan et al. ................. | 521/125 |

FOREIGN PATENT DOCUMENTS

| | | |
|---|---|---|
| 103843 | 5/1986 | Japan . |
| 132539 | 5/1989 | Japan . |
| 139539 | 6/1989 | Japan . |
| 204424 | 8/1990 | Japan . |

OTHER PUBLICATIONS

Kokai Patent Publication JP 3244621-A, published Oct. 31, 1991.
Kokai Patent Publication JP 3244644-A, published Oct. 31, 1991.
K. Uhlig, Kunstostoffe 80 (1990) 127–136.
Kunststoff-Handbuch 7, Polyurethane, Hanser Verlag Munich 1983, pp. 103/104.

Primary Examiner—James J. Seidleck
Assistant Examiner—Rabon Sergent
Attorney, Agent, or Firm—Jay P. Friedenson

[57] ABSTRACT

The present invention relates to foam compositions which are expanded with hydrohalocarbon blowing agents in the presence of catalysts which are capable of decreasing the amount of decomposition of the hydrohalocarbon blowing agents to haloalkenes during the polymerization. Thus, the present invention provides compositions comprising polyisocyanate, polyol, hydrohalocarbon blowing agent, surfactant, and catalyst for polymerization of the polyisocyanate and polyol wherein the catalyst is capable of decreasing the amount of decomposition of the hydrohalocarbon blowing agents to haloalkenes during polymerization of the polyisocyanate and the polyol.

8 Claims, No Drawings

CATALYSTS WHICH STABILIZE HYDROHALOCARBON BLOWING AGENT IN POLYISOCYANURATE FOAM FORMULATIONS DURING POLYMERIZATION

This application is a division of application Ser. No. 07/752,295, filed Aug. 30, 1991, now U.S. Pat. No. 5,395,859, which is a continuation-in-part of application Ser. No. 718,528 filed Jun. 21, 1991, now abandoned.

This invention relates to closed cell polyisocyanurate foams expanded with hydrohalocarbons in the presence of specific polymerization catalysts which also serve to maintain the chemical integrity of the hydrohalocarbon.

BACKGROUND OF THE INVENTION

It is well known to those skilled in the art that polyisocyanurate foams can be prepared by reacting and foaming a mixture of ingredients, consisting in general of an organic polyisocyanate (including diisocyanate) and an appropriate amount of polyol or mixture of polyols in the presence of a volatile liquid blowing agent, which is caused to vaporize by the heat liberated during the reaction of polyisocyanate and polyol. It is also well known that this reaction and foaming process can be enhanced through use of amine and metal carboxylate catalysts as well as surfactants. The catalysts ensure adequate curing of the foam while the surfactants regulate and control cell size.

In the class of foams known as low density rigid polyisocyanurate foam, the blowing agent of choice has been trichlorofluoromethane, $CCl_3F$ (known in the art as CFC-11). These types of foams are closed-cell foams in which the CFC-11 vapor is encapsulated or trapped in the matrix of closed cells. They offer excellent thermal insulation, due in part to the very low thermal conductivity of CFC-11 vapor, and are used widely in insulation applications, e.g. roofing systems and building panels. Generally, 1 to 60 parts by weight and typically, 15 to 40 parts by weight of blowing agent per 100 parts by weight polyol are used in rigid polyisocyanurate formulations.

In 1985, about 140 MM lbs. of blowing agents including CFC-11 and dichlorodifluoromethane (known in the art as CFC-12) were used in the U.S. to produce all types of insulation foams. Of this total volume, about 70% or 100 MM lbs. were used to make polyurethane foam. Closed-cell polyurethane foam is the most energy efficient insulating material available having an R value of approximately 7.2 per inch whereas fiberglass has an R value of approximately 3.1 per inch.

Closed-cell polyurethane foams are widely used for insulation purposes in building construction and in the manufacture of energy efficient electrical appliances. In the construction industry, polyurethane modified polyisocyanurate board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and rail cars.

In the early 1970's, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are widely used as propellants in aerosols, as blowing agents for foams, as refrigerants, and as cleaning/drying solvent systems. Because of the great chemical stability of fully halogenated chlorofluorocarbons, according to the ozone depletion theory, these compounds do not decompose in the earth's lower atmosphere but reach the stratosphere where they slowly degrade liberating chlorine atoms which in turn react with the ozone.

During the period of 1978 to the present, much research was conducted to study the ozone depletion theory. Because of the complexity of atmospheric chemistry, many questions relating to this theory remain unanswered. However, if the theory is valid, the health risks which would result from depletion of the ozone layer are significant. This, coupled with the fact that world-wide production of chlorofluorocarbons has increased, has resulted in international efforts to reduce chlorofluorocarbon use. Most recently, the United States Clean Air Act calls for total phaseout of CFC's by the year 2000.

Because of this proposed reduction in availability of fully halogenated chlorofluorocarbons such as CFC-11 and CFC-12, alternative, more environmentally acceptable products are urgently needed.

As early as the 1970's with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the lower atmosphere and not reach the stratosphere and the ozone layer. Table I lists the ozone depletion potentials for a variety of fully and partially halogenated halocarbons. Greenhouse potential data (potential for reflecting infrared radiation (heat) back to earth and thereby raising the earth's surface temperature) are also shown. In Table I, the ozone depletion potentials and greenhouse potentials were calculated relative to CFC-11.

TABLE I

| Blowing Agent | Ozone Depletion Potential | Greenhouse Potential |
|---|---|---|
| CFC-11($CFCl_3$) | 1.0 | 1.0 |
| CFC-12($CF_2Cl_2$) | 1.0 | 3.1 |
| HCFC-22($CHF_2Cl$) | 0.05 | 0.36 |
| HCFC-123($CF_3CHCl_2$) | 0.015 | 0.02 |
| HCFC-141b($CFCl_2CH_3$) | 0.15 | 0.15 |

Halocarbons such as HCFC-123 and HCFC-141b are environmentally acceptable in that they theoretically have minimal effect on ozone depletion.

Organic substances which bear a hydrogen on one carbon and a halogen (F, Cl, Br, I) on an adjacent carbon, will undergo so-called elimination reactions, under the influence of bases or acids, to produce haloalkenes and hydrogen halides or products from the combination of the hydrogen halide with the base, known as salts.

Therefore, in view of the fact that some of the major and many of the minor components, i.e., polyols and catalysts (amines, metal salts), are of known basic character, dehydrohalogenation of the above mentioned hydrohalocarbons might occur. Examples of such reactions are as follows:

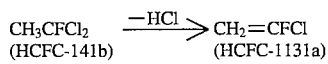

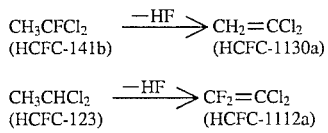

Many of these haloalkenes possess unknown properties and it is therefore desirable to hold their formation to a minimum as a precautionary measure.

Tests performed using the above hydrohalocarbons as blowing agents, in typical foam formulations now in commercial use, revealed that the haloalkenes can be found in the cells of the cured foam at concentrations as high as 10,000 parts per million/weight relative to the blowing agent.

Stabilizers have been added to hydrohalocarbons to inhibit or minimize the generation and buildup of degradation products. For example, Kokai Patent Publication 103, 843 published May 22, 1986 teaches that the addition of benzotriazole stabilizes 1,2-dichloro- 1-fluoroethane when it is exposed to metallic surfaces in the presence of hydroxylic solvents, e.g. water or alcohols. Kokai Patent Publication 132,539 published May 25, 1989 teaches the addition of nitro compounds, phenols, amines, ethers, amylenes, esters, organic phosphites, epoxides, and triazoles to 1,2-dichloro-1-fluoroethane containing compositions in order to stabilize the compositions upon contact with metallic cleaning apparatus. Kokai Patent Publication 139,539 published Jun. 1, 1989 teaches the addition of nitro compounds, phenols, amines, ethers, amylenes, esters, organic phosphites, epoxides, furans, alcohols, ketones, and triazoles to 1,2-dichloro-1,1,2-trifluoroethane containing compositions in order to stabilize the compositions upon contact with metallic cleaning apparatus. U.S. Pat. No. 4,861,926 teaches that 1,1,1-trichloroethane can be stabilized with mixtures of epoxybutane, nitromethanes, 2-methylfuran, and methyl acetate in textile dry cleaning and metal degreasing applications. The Abstract of Japanese 2,204,424 published Aug. 14, 1990 teaches that hydrochlorofluoropropanes in the presence of steel are thermally stabilized by adding nitro compounds, phenols, amines, ethers, esters, epoxides, alcohols, ketones, or triazoles.

Specialized chemical additives are often present in low density rigid polyurethane and polyisocyanurate foams to enhance certain performance features of the foam e.g. flame retardants, antioxidants, and solubilizing surfactants. Such additives are dissolved in a formulation component or pre-mix prior to foam production. Flame retardants include halocarbons, e.g. chloroalkyl phosphate esters, polybromoalkanes, or polybromoaromatics. Antioxidants are typically phosphite esters. Solubilizing agents commonly used are ethoxylated nonylphenols.

SUMMARY OF THE INVENTION

We have found that certain catalysts, in addition to catalyzing the polymerization of polyisocyanates and polyols, are capable of decreasing the amount of decomposition of hydrohalocarbon blowing agent to haloalkenes during polymerization of the polyisocyanates and the polyols. Thus, the present invention provides compositions comprising polyisocyanate, polyol, hydrohalocarbon blowing agent, surfactant, and catalyst for polymerizing the polyisocyanate and polyol wherein the catalyst is capable of decreasing the amount of decomposition of the hydrohalocarbon blowing agent to haloalkenes during polymerization of the polyisocyanate and the polyol. Preferably, the catalyst is selected from the group consisting of hydroxyalkylammonium carboxylates; N-substituted triazines; metal chloroalkanoates; and metal(haloalkoxyacyl)carboxylates.

The term "haloalkenes" as used herein means those organic materials having at least one double bond and at least one halogen atom therein. The haloalkenes which form depend on the hydrohalocarbon blowing agent used. For example, if the blowing agent used is 1,1-dichloro- 1-fluoroethane, the haloalkenes which may form include 1,1-dichloroethylene and 1-chloro-1-fluoroethylene. If the blowing agent used is 1,1-dichloro- 2,2,2-trifluoroethane, the haloalkene which may form is 1,1-dichloro-2,2-difluoroethylene.

Preferably, the use of selected catalyst is effective when the amount of haloalkenes formed by the practice of the present invention is less than about 75% of the amount of haloalkenes formed in the absence of the present invention. Thus, if the amount of haloalkenes formed in the absence of the present invention is X, the amount of haloalkenes formed by the practice of the present invention is less than about (0.75) (X). More preferably, the amount of haloalkenes formed by practice of the present invention is less than about 50% of the amount of haloalkenes formed in the absence of the present invention. Thus, if the amount of haloalkenes formed in the absence of the present invention is X, the amount of haloalkenes formed by the practice of the present invention is less than about (0.50) (X).

Other advantages of the present invention will become apparent from the following description.

DETAILED DESCRIPTION OF THE PREFERRED EMBODIMENTS

Although not wishing to be bound by theory, we believe that the currently used catalyst and polyisocyanate form a complex which is a strong base that serves to initiate dehydrohalogenation reactions. Any catalyst which does not form such a strong base or, if formed, moderates its dehydrohalogenation ability and also polymerizes the polyisocyanate and polyol is useful in practicing the present invention. Preferred catalysts are hydroxyalkylammonium carboxylates; N-substituted triazines; metal chloroalkanoates; and metal(haloalkoxyacyl) carboxylates.

Preferred hydroxyalkylammonium carboxylates are of the formula

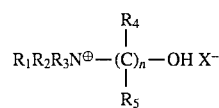

where $n \geq 2$; $R_1$, $R_2$, $R_3$, $R_4$, and $R_5$ are the same or different and selected from hydrogen and alkyl having 1 to 18 carbon atoms; and $X^-$ is $R_6CO_2^-$ where $R_6$ is

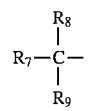

where $R_7$, $R_8$, and $R_9$ are the same or different and selected from hydrogen, bromine, chlorine, alkyl having 1 to 18 carbon atoms, and substituted alkyl and alkoxy having 2 to 18 carbon atoms containing —$(O)_a$—$CH_2$—$CR_{10}R_{11}Cl$ where $R_{10}$ and $R_{11}$ are the same or different and selected from hydrogen, bromine, chlorine, aryl, and alkyl having 1 to 8 carbon atoms and a is 0 or 1.

The more preferred hydroxyalkylammonium carboxylates are of the formula $R_1R_2R_3N^+$—$CHR_4CR_5HOH\ X^-$ and $R_1R_2R_3N^+$—$CH_2CR_4HOH\ X^-$ where $R_1, R_2, R_3, R_4$, and $R_5$ are the same or different and selected from the group consisting of hydrogen and alkyl having 1 to 18 carbon atoms and $X^-$ is as defined above. Examples of the more preferred hydroxyalkylammonium carboxylates include DABCO® TMR® which is N-2-hydroxypropyltrimethylammonium 2-ethylhexanoate and DABCO® TMR-2® which is N-2-hydroxypropyltrimethylammonium formate, which are commercially available from Air Products and Chemicals, Inc. Other preferred hydroxyalkylammonium carboxylates include N-2-hydroxypropyldimethylethylammonium 2,2-dimethylpropanoate; N-2-hydroxyethyltrimethylammonium 2-ethylhexanoate; N-2-hydroxypropyl-trimethylammonium acetate; N-2-hydroxyethyltrimethylammonium 2,2,2-trichloroethoxyacetate; N-2-hydroxyethyltriethylammonium 2-chloroethoxyacetate; N-2-hydroxypropyltrimethylammonium trichloroacetate; and N-2-hydroxypropyltriethyl-ammonium 4,4,4-trichlorobutyrate.

Preferred N-substituted triazines are of the formula $C_3H_6N_3$-$[(R_{12}R_{13}C)_n\ NR_{14}R_{15}]_3$ where $n \leq 2$; $R_{12}$ and $R_{13}$ are the same or different and selected from hydrogen and alkyl having 1 to 18 carbon atoms; and $R_{14}$ and $R_{15}$ are the same or different and selected from alkyl having 1 to 18 carbon atoms, substituted alkyl having 1 to 18 carbon atoms, cycloalkyl having 1 to 18 carbon atoms, aryl having 1 to 18 carbon atoms, and substituted aryl having 1 to 18 carbon atoms. The more preferred substituted triazines include Polycat®41 which is hexahydro-1,3,5-tris[3(N,N-dimethylamino)propyl]-1,3,5-triazine which is commercially available from Air Products and Chemicals Inc. and hexahydro-1,3,5-tris[3(N,N-dimethylamino)ethyl]-1,3,5-triazine; hexahydro-1,3,5-tris[3(N,N-ethylmethylamino)propyl]-1,3, 5-triazine; hexahydro-1,3,5-tris[3(N,N-diethylamino)propyl]-1,3,5-triazine; and hexahydro-1,3,5-tris[3(N,N-dimethylamino)butyl]-1,3,5-triazine.

Preferred metal salts of chloroalkanoates are of the formula $(M^+)\ (X^-)_n$ where $M^+$ is selected from the alkali metal ions $K^+$ or $Na^+$; the alkaline earth metal ions $Ca^{+2}$, $Mg^{+2}$, or $Ba^{+2}$; and the dibutyltin divalent ion (n—$C_2H_9)_2Sn^{+2}$ where n is 1 or 2; and where $X^-$ is of the formula $R_{16}C(R_{17})(R_{18})CO_2^-$ wherein $R_{16}$ and $R_{17}$ are the same or different and selected from hydrogen, bromine, chlorine, and alkyl having 1 to 18 carbon atoms and is selected from chlorine, and substituted alkyl and alkoxy having 2 to 18 carbon atoms containing —$(O)_a$—$CH_2$—$CR_{19}R_{20}Cl$ wherein $R_{19}$ and $R_{20}$ are the same or different and selected from hydrogen, bromine, chlorine, aryl and alkyl having 1 to 8 carbons, and a is 0 or 1. Examples of the more preferred metal salts of chloroalkanoates include $K^+,^-O_2CCH_2CCl_3$; $K^+,^-O_2CCH_2OCH_2CCl_3$; $K^+,^-O_2CC(CH_2CCl_3H(CH_2)_3CH_3$; and $K^+,^-O_2CC(OCH_2CCl_3)H(CH_2)_3CH_3$ wherein $K^+$ is selected from the cations listed above.

Preferred haloalkoxyacylated carboxylate salts are of the formula $M^{+-}O_2C$—$R_{21}$—COO—$CH_2$—$CH_aY_b$ where M, is selected from alkali metal ions $K^+$ or $Na^+$ and from alkaline earth metal ions $Ca^{+2}$, $Mg^{+2}$, or $Ba^{+2}$; $R_{21}$ is selected from an alkylidene having —$(CH_2)_d$— where d is an integer from 1 to 3 or 1,2-phenylene, Y is bromine or chlorine, b is an integer from 1 to 3, and a+b=3. Examples of the more preferred haloalkoxyacylated carboxylate salts include $K^+,^-O_2CCH_2COOCH_2CCl_3$; $K^+,^-O_2C(CH_2)_2COOCH_2CCl_3$; and $K^+,ortho^-(COOCH_2\ CCl_3)$benzoate wherein $K^+$ is selected from the cations listed above.

In accordance with this invention, any of these catalysts or combinations of these catalysts or their chemical equivalents may be used as described previously to prepare a variety of polyisocyanurate foams by standard techniques known to the art which may include the use of various standard additives such as surfactants, water, fire retardants, and others.

The typically used ratios of polyisocyanate to polyol and of blowing agent to these components may be used in practicing the present invention.

The use of these catalysts will provide rigid foams with significantly reduced levels of haloalkenes compared to the levels of haloalkenes found when using the catalysts commonly used in the rigid foam industry.

The amount of the catalysts employed in the present invention will vary depending upon the application, the type of foam being prepared, the identity of the polyol and other factors, but can readily be determined by anyone skilled in the art. The catalyst is used in an amount sufficient to polymerize the polyisocyanate and the polyol and also to decrease the amount of decomposition of the hydrohalocarbons to haloalkenes during the polymerization. Preferably, at least about 0.5 part catalyst per 100 parts by weight of polyol is used. More preferably, from about 0.5 part to 5.0 parts catalyst per 100 parts by weight of polyol are used.

Examples of polyols used in polyurethane modified polyisocyanurate foams include aromatic polyester polyols such as those based on complex mixtures of terephthalate-type or phthalate-type esters formed from polyols such as ethylene glycol, diethylene glycol, or propylene glycol. These polyols are used in rigid laminated boardstock, can be blended with other types of polyols such as sucrose based polyols, and used in other applications such as molded urethane foams.

Examples of polyisocyanates used in polyurethane modified polyisocyanurate foams include aromatic diisocyanates such as those based on mixtures of 2,4- and 2,6-toluene diisocyanate; these polyisocyanates are used in specialty foams. Another example is methylene diphenyl diisocyanate (MDI) which typically contains 55% diphenylmethane diisocyanates, 25% triisocyanates, and 20% higher polyisocyanates.

Any hydrofluorocarbon blowing agent may be used in the present invention. Preferred hydrofluorocarbon blowing agents include 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1,1,1,3-tetrafluoropropane; 1,1,2,3,3-pentafluoropropane; and 1,1,1,3,3-pentafluoro-n-butane.

Any hydrochlorofluorocarbon blowing agent may be used in the present invention. Preferred hydrochlorofluorocarbon blowing agents include 1-chloro- 1,2-difluoroethane; 1-chloro-2,2-difluoroethane; 1-chloro-1,1-difluoroethane; 1,1-dichloro-1-fluoroethane; 1-chloro-1,1,2-trifluoroethane; 1-chloro- 1,2,2-trifluoroethane; 1,1-dichloro-1,2-difluoroethane; 1-chloro-1,1,2,2-tetrafluoroethane; 1-chloro-1,2,2,2-tetrafluoroethane; 1,1-dichloro-1,2,2-trifluoroethane; 1,1-dichloro-2,2,2-trifluoroethane; and 1,2-dichloro- 1,1,2-trifluoroethane. The most preferred hydrochlorofluorocarbon blowing agent is 1,1-dichloro-1-fluoroethane.

Mixtures of the preferred hydrohalocarbon blowing agents may also be used in the present invention. Preferred mixtures of hydrohalocarbon blowing agents include a mixture of 1,1-dichloro-1-fluoroethane with 1,1-dichloro-2,2,2-trifluoroethane and a mixture of 1,1-dichloro-2,2,2-trifluoroethane with 1,2-dichloro- 1,2,2-trifluoroethane.

Examples of surfactants for polyurethane modified polyisocyanurate foams are polyether modified polysiloxanes. These silicone surfactants are typically non-hydrolyzable siliconepolyoxyethylene/polyoxypropylene copolymers. Other examples include non-silicon-containing organic surfactants which are proprietary in structure. Tegostab®B-8404 is a silicone surfactant which is available from Goldschmidt Chemical Company. Other commercially available silicone surfactants include Tegostab®B-8408 which is available from Goldschmidt Chemical Company, Dabco®DC-193 which is available from Air Products and Chemicals, Inc., and L-5420® which is available from Union Carbide. LK®-443 is an organic surfactant which is available from Air Products and Chemicals, Inc.

The present invention also provides a composition of polyol, surfactant, hydrohalocarbon blowing agent, and catalyst wherein the catalyst is capable of decreasing the amount of decomposition of the hydrohalocarbon blowing agent to haloalkenes.

Thus, the present invention provides a process for preparing polyurethane modified polyisocyanurate foams. The process comprises the step of reacting polyol with polyisocyanate in the presence of hydrohalocarbon blowing agent, surfactant, and catalyst. The catalyst is capable of decreasing the amount of decomposition of the hydrohalocarbon blowing agent to haloalkenes during polymerization of the polyisocyanate and the polyol. The present invention also provides polyurethane modified polyisocyanurate foams prepared by the foregoing process. The present invention further provides polyurethane modified polyisocyanurate articles prepared by the foregoing process.

It will be evident to those skilled in the art that water may be included in the polyurethane modified polyisocyanurate foam formulations to generate carbon dioxide as a supplemental blowing agent by reaction with polyisocyanate. In addition, water generated intermediates can form cross-linked polymeric structures that may enhance physical properties of the final product.

In a more preferred embodiment, the present invention provides polyurethane modified polyisocyanurate compositions comprising polyisocyanate, polyol, hydrohalocarbon blowing agent, surfactant, catalyst for the polymerization of the polyisocyanate and polyol, and additive wherein the catalyst is capable of decreasing the amount of decomposition of the hydrohalocarbon blowing agent to haloalkenes and the additive is capable of decreasing the amount of decomposition of hydrohalocarbon to haloalkenes during polymerization of the polyisocyanate and the polyol.

The catalysts described above are useful in this embodiment. Preferably, the catalyst is present at an amount of at least about 0.5 part by weight per hundred parts of polyol. More preferably, the catalyst is present at an amount of about 0.5 part to about 5 parts by weight per hundred parts of polyol. It should be understood that a co-catalyst such as a tertiary amine may also be used for its catalytic effect but it does not contribute to the substantial reduction in formation of haloalkenes during polymerization. The co-catalyst may be present at an amount of at least about 0.5 part to about 2 parts by weight per hundred parts of polyol. Tertiary amine catalysts which may be used include triethylene diamine; N,N-dimethylethanolamine; 1,8-diazabicyclo(5.4.0)undecene- 7; N,N-dimethylcyclohexylamine; and 2,4,6-tris(dimethylaminomethyl)phenol.

Preferred additives include nitroalkanes; bromoalkanes; bromoalcohols; chloroalcohols; and di(hydroxyalkyl)esters of tetrabromophthalic acid.

Preferred nitroalkanes are of the formula $R^1R^2CHNO_2$ where $R^1$ is selected from the group consisting of hydrogen, alkyl having 1 to 18 carbon atoms, cycloalkyl, substituted alkyl, aryl, and substituted aryl and $R^2$ is selected from the group consisting of hydrogen and methane. More preferred nitroalkanes include nitromethane; nitroethane; 1-nitropropane; 2-nitropropane; 1-nitrobutane; nitrocyclohexane; 1-nitrohexane; nitrocyclopentane; and 1-nitropentane. The foregoing nitroalkanes are commercially available.

Preferred bromoalkanes are of the formula $(Br)_aC(H)_b$ where a is 1, 2, 3, or 4 and a+b=4; $(Br)_c(H)_dC—CH(R')_e(R^2)_f$ where c is 1, 2, or 3, c+d=3, e+f=2, and R' and $R^2$ are the same or different and selected from the group consisting of hydrogen, alkyl having 1 to 18 carbon atoms, substituted alkyl, haloalkyl, aryl, and substituted aryl; and $(Br)_aC(R^1)_b(R^2)_c(R^3)_d$ where a is 1, 2, 3, or 4 and a+b+c+d=4 and $R^1$, $R^2$, and $R^3$ are the same or different and selected from the group consisting of hydrogen, linear alkyl having 1 to 18 carbon atoms, substituted alkyl, haloalkyl, aryl, and substituted alkyl. More preferred bromoalkanes include bromomethane; dibromomethane; carbon tetrabromide; bromoform; 1,2-dibromobutane; 1,3-dibromobutane; 1,4-dibromobutane; 2,3-dibromobutane; 1,4-dibromo-2,3-butanediol; 2,3-dibromo- 1,4-butanediol; 1,4-dibromo-2-butanol; 1,4-dibromo- 2-butene; 1,10-dibromodecane; 1,2-dibromoethane; 1,12-dibromododecane; (1,2-dibromoethyl)benzene; 1,7-dibromoheptane; and 1,6-dibromohexane. The foregoing bromoalkanes are commercially available.

Preferred bromoalcohols are of the formula $(Br)_a(H)_b(R^1)_cC—C(H)_d(R^2)_eOH$ where a is 1, 2, or 3; c is 0 or 1; a+b+c=3; d is 1 or 2; d+e=2; and $R^1$ and $R^2$ are the same or different and selected from the group consisting of hydrogen, alkyl having 1 to 18 carbon atoms, cycloalkyl, substituted alkyl, hydroxyalkyl, aryl, and substituted aryl and when a=3 and d=e=1, $R^2$ may also be OH or $OR^2$ wherein $R^2$ is alkyl having 1 to 18 carbon atoms, cycloalkyl, substituted alkyl, and hydroxyalkyl. More preferred bromoalcohols include 2,2,2-tribromoethanol; 2,2-dibromoethanol; 2-bromoethanol; 1,4-dibromo-2,3-butanediol; 2,3-dibromo- 1,4-butanediol; 1,4-dibromo-2-butanol; 1,3-dibromopropanol; 2,3-dibromopropanol; 2,2,2-tribromo-1,1-dihydroxyethane; and 2,2,2-tribromo-1-methoxyethanol. Many of the foregoing bromoalcohols are commercially available.

Preferred chloroalcohols are of the formula $(Cl)_a(H)_b(R^1)_cC—C(H)_d(R^2)_eOH$ where a is 1, 2, or 3; c is 0 or 1; a+b+c=3; d is 1 or 2; d+e=2; and $R^1$ and $R^2$ are the same or different and selected from the group consisting of hydrogen, alkyl having 1 to 18 carbon atoms, cycloalkyl, substituted alkyl, hydroxyalkyl, and aryl and when a=3 and d=e=1, $R^2$ may also be OH or $OR^2$ wherein $R^2$ is alkyl having 1 to 18 carbon atoms, cycloalkyl, substituted alkyl, and hydroxyalkyl. More preferred chloroalcohols include 2,2,2-trichloroethanol; 2,2-dichloroethanol; 2-chloroethanol; 1,3-dichloro-2-propanol; 1,4-dichloroethanol; 2,3-butanediol; 1,4-dichloro-2-butanol; 2,2-dichloro-1-pentanol; 1,1-dichloro-2-pentanol; 1-chloropentanol; 2-chloro- 1-pentanol; 2-chloro-1-phenylethanol; 1-chloro- 1-phenyl-2-propanol; 2,2,2-trichloro-1,1-dihydroxyethane; and 2,2,2-trichloro-1-methoxyethanol. Some chloroalcohols are commercially available.

The preferred di(hydroxyalkyl)ester of tetrabromophthalic acid is PHT4-DIOL® which is the (2'-hydroxyethoxy)ethyl, 2-hydroxypropyl mixed ester of tetrabromophthalic acid and is available from Great Lakes Chemical Corporation.

Preferably, the additive is present at an amount of at least about 0.5 part by weight per hundred parts of polyol. More preferably, the additive is present at an amount of about 0.5 part to about 6 parts by weight per hundred parts of polyol. The additive is introduced preferably by dissolution in the blowing agent, in the polyol, in a mixture of two or more of the components, or it can be added as a separate stream at the point of mixing in the polymerization process. Thus, the present invention also provides a composition comprising hydrohalocarbon, polyol, catalyst, surfactant, and additive wherein the combination of the catalyst and additive is capable of decreasing the amount of decomposition of hydrohalocarbon to haloalkenes.

The beneficial effect of the combination of trimerization catalyst and additive in polyurethane modified polyisocyanurate foam formulations is realized during the polymerization reaction within the normal processing time and temperature conditions occurring during typical foam blowing conditions.

The present invention also provides a process for preparing polyurethane modified polyisocyanurate foams. The process comprises the step of reacting polyol with polyisocyanate in the presence of hydrohalocarbon blowing agent, catalyst, surfactant, and additive. The combination of the catalyst and the additive is capable of decreasing the amount of decomposition of hydrohalocarbon to haloalkenes during polymerization of the isocyanate and the polyol. The present invention also provides a polyurethane modified polyisocyanurate foams prepared by the foregoing process. The present invention further provides a polyurethane modified polyisocyanurate article prepared by the foregoing process.

This invention is more fully illustrated by the following non-limiting examples in which parts or percentages are by weight unless otherwise specified.

The polyols used in the Comparatives and the Examples are in Table II below. The Polyester Polyol is Aromatic Polyester Polyol.

TABLE II

| POLYESTER POLYOL | TRADENAME | SOURCE |
|---|---|---|
| A | Terate ® 254 | Cape Industries |
| B | Terate ® 203 | Cape Industries |
| C | Chardol ® 336A | Oxid Inc. |
| D | Stepanpol ® PS 2502A | Stepan Co. |

COMPARATIVE

In this example, baseline data for the behavior of HCFC-141b, in the most commonly used formulations in polyisocyanurate foams is established. The foams were prepared and analyzed as described hereafter.

The "hand mix" procedure, to be described, follows commonly accepted practices used for experimental evaluations in the rigid polyisocyanurate foam industry. The polyol, 200 grams, was weighed into a quart container followed by the appropriate quantities of catalyst(s), surfactant, and blowing agent. This mixture of all formulation components, excluding the reactive polyisocyanate, is known to the industry as the B-side of the foam formulation. This B-side blend was thoroughly mixed for 10 seconds using a Jiffy speed mixer. Excessive whipping in air was avoided and any blowing agent that was lost during the mixing was replaced. The required amount of polyisocyanate was then added with thorough mixing at approximately 2200 revolutions per minute for 10 seconds. The mixture was poured rapidly into a 25.4 cm×25.4 cm×10.2 cm cakebox. The foam was then cured overnight at room temperature. The cured rigid foam was sampled by a specific cutting technique that provided four foam strips measuring 1 cm×1 cm×9 cm, from the center of the foam bun. The four strips were placed in an 8 oz. screw cap bottle which was then sealed with a #10130 MININERT® pushbutton gas chromatographic sampling valve available from Pierce Chemical Co.

The absolute amounts of haloalkenes formed in foams blown with HCFC-141b may be determined using capillary gas chromatography as outlined in Table III below.

TABLE III

| CHROMATOGRAPH: | HEWLETT-PACKARD 5890 |
|---|---|
| CARRIER GAS: | HELIUM |
| INJECTOR: | CAPILLARY: CAPABLE OF 50:1 SPLIT |
| DETECTOR: | FID |
| COLUMN: | DB-1301 FUSED SILICA, 120 m × 0.25 mm, 1 μm FILM. AVAILABLE FROM J&W |

Three accurately prepared standards of the compounds of interest covering the ranges expected in the samples were prepared in the same type bottle used for the samples. Standards were prepared and analyzed daily.

The operating parameters are in Table IV below.

TABLE IV

| CARRIER FLOW RATE: | HEAD PRESSURE 40 PSIG, He |
|---|---|
| INJECTOR TEMPERATURE: | 150° C. |
| DETECTOR TEMPERATURE: | 250° C. |
| COLUMN CONDITIONS: | 20° C. FOR 15 MIN. 5° C./MIN. TO 40° C. |
| HOLD: | 5 MINUTES, 15° C./MIN. TO 230° C. |
| HOLD: | 30 MINUTES |
| INJECTION SIZE: | 2.0-ML VIA GAS TIGHT SYRINGE. |

Samples were received in 250-ml glass screw top bottles sealed with the previously described Mininert® Valves.

This method was used to separate and quantify the compounds in Table V below. RT means retention time and is in minutes.

TABLE V

| COMPOUND | STRUCTURE | RT |
|---|---|---|
| 1131a | $CH_2=CCIF$ | 12.71 |
| 141b | $CCl_2F-CH_3$ | 23.82 |

All standards and samples were injected as vapor (gas) via a gas tight syringe. Calibration graphs of weight vs. peak were constructed. The peak area from the sample was determined and converted to weight via the calibration graph.

The weight of each component was taken from the calibration graphs. The equation is as follows:

$$\frac{\mu g \text{ component}}{g\text{-HCFC-141b}} = \frac{\mu g\text{-component from curve}}{g\text{-HCFC-141b from curve}}$$

Standardized quantities of polyol, blowing agent, catalysts, and surfactant were used as indicated in Table VI. The quantity of polyisocyanate was varied slightly in order to meet the stoichiometric requirements of the various polyols.

In Table VI, the polyol was Stepanpol PS-2502A® obtained from the Stepan Company. The surfactant was B8404® silicone surfactant obtained from Goldschmidt Chemical Co. The potassium octoate catalyst was DABCO® K-15 obtained from Air Products and Chemicals, Inc. The amine catalyst was DABCO® TMR-30 obtained from Air Products and Chemicals, Inc. The polyisocyanate was Lupranate M-20S® obtained from the BASF Corporation. The components are indicated in parts by weight.

TABLE VI

| COMPONENT | WT(PBW) |
|---|---|
| Polyol | 100 |
| Surfactant | 2 |
| Potassium Octoate | 3 |
| Amino Catalyst | 0.5 |
| Polyisocyanate | 164 |
| HCFC-141b | 35 |

The results of these tests, using the aromatic polyester polyols, are summarized in Table VII which shows that the commonly used catalyst combination of potassium octoate and 2,4,6-tris(dimethylaminomethyl)phenol resulted in partial conversion of HCFC-141b to HCFC-1131a during foam formation. We noticed a difference in the extent of the conversion depending on the type of polyol used.

TABLE VII

| POLYESTER POLYOL | ppm HCFC-1131a in HCFC-141b |
|---|---|
| A | 1920 |
| B | 1970 |
| C | 2000 |
| D | 2730 |

EXAMPLES 1 THROUGH 19

In these examples, the advantages of using the catalysts of the invention are made evident. All foams were prepared as in the Comparative except that the catalysts of the present invention were used instead of potassium octoate plus the aminophenol. The catalyst was used in an amount of 0.5 to 5 parts by weight. The catalyst was added to the mixture of polyol and other ingredients prior to blending with the polyisocyanate.

In Tables VIII through XII, the Polyester Polyols are from Table II above. In Examples 1 through 4 (Table VIII), the catalyst was DABCO® TMR® which is N-2-hydroxypropyltrimethylammonium 2-ethylhexanoate which is commercially available from Air Products and Chemicals, Inc. In Examples 5 through 8 (Table IX), the catalyst was DABCO® TMR-2® which is N-2-hydroxypropyltrimethylammonium formate which is commercially available from Air Products and Chemicals, Inc. In Examples 9 through 11 (Table X), the catalyst was DABCO® TMR-3® which is proprietary but believed to be similar to DABCO® TMR® catalyst described above and is commercially available from Air Products and Chemicals, Inc.

In Examples 12 through 15 (Table XI), the catalyst was DABCO® TMR-4® which is proprietary but believed to be similar to DABCO® TMR® catalyst described above. In Examples 16 through 19 (Table XII), the catalyst was POLYCAT® 41 which is hexahydro-1,3,5-tris[3(N,N-dimethylamino)propyl]-1,3,5-triazine and is commercially available from Air Products and Chemicals, Inc. Other co-catalysts which are not part of the present invention may have been present but are not believed to be a factor in substantially reducing haloalkene formation.

TABLE VIII

| EXAMPLE | ppm HCFC-1131a in HCFC-141b | POLYESTER POLYOL |
|---|---|---|
| 1 | 731 | A |
| 2 | 387 | B |
| 3 | 675 | C |
| 4 | 500 | D |

TABLE IX

| EXAMPLE | ppm HCFC-1131a in HCFC-141b | POLYESTER POLYOL |
|---|---|---|
| 5 | 662 | A |
| 6 | 564 | B |
| 7 | 437 | C |
| 8 | 764 | D |

TABLE X

| EXAMPLE | ppm HCFC-1131a in HCFC-141b | POLYESTER POLYOL |
|---|---|---|
| 9 | 482 | A |
| 10 | 416 | B |
| 11 | 527 | D |

TABLE XI

| EXAMPLE | ppm HCFC-1131a in HCFC-141b | POLYESTER POLYOL |
|---|---|---|
| 12 | 327 | A |
| 13 | 699 | B |
| 14 | 332 | C |
| 15 | 420 | D |

TABLE XII

| EXAMPLE | ppm HCFC-1131a in HCFC-141b | POLYESTER POLYOL |
|---|---|---|
| 16 | 399 | A |
| 17 | 461 | B |
| 18 | 597 | C |
| 19 | 410 | D |

These data show that using the catalysts of this invention resulted in greater than 50% reduction in formation of haloalkenes from hydrohalocarbons during foam formation.

EXAMPLE 20

The same polyurethane modified polyisocyanurate foam as in Example 2 was prepared except that in addition to the use of the DABCO® TMR® catalyst which is N-2-hydroxypropyltrimethylammonium 2-ethylhexanoate and available from Air Products and Chemicals, Inc., PHT4-DIOL® additive, which is a mixed di(hydroxyalkyl) ester of tetrabromophthalic acid and available from Great Lakes Chemical Corporation, was used. The catalyst was added to the B-side formulation mixture in an amount of 3 grams/100 grams polyol. The additive was added to the B-side in an amount of 5.3 grams/100 grams polyol. The analysis for HCFC-1131a is shown in Table XIII below.

EXAMPLE 21

The same polyurethane modified polyisocyanurate foam as in Example 6 was prepared except that in addition to the use of the DABCO® TMR-2® catalyst which is N-2-hydroxypropyltrimethylammonium formate and available from Air Products and Chemicals, Inc., tetrabromomethane was added. The catalyst was added to the B-side in an amount of 4.5 grams/100 grams polyol. The additive dissolved in the HCFC-141b blowing agent, was added in an amount of 2.5 grams/100 grams polyol. The analysis for HCFC-1131a is shown in Table XIII below.

EXAMPLE 22

The same polyurethane modified polyisocyanurate foam as in Example 13 was prepared except that in addition to the use of the DABCO® TMR-4® catalyst which is proprietary but believed to be comparable to DABCO-TMR® catalyst, nitromethane was added. The catalyst was added to the B-side in an amount of 4.5 grams/100 grams polyol. The additive dissolved in the HCFC-141b blowing agent, was added in an amount of 0.5 gram/100 grams polyol. The analysis for HCFC-1131a is shown in Table XIII below.

EXAMPLE 23

The same polyurethane modified polyisocyanurate foam as in Example 17 was prepared except a mixture of POLY-CAT®-41 and 43 catalysts were used. POLYCAT®-41 is hexahydro-1,3,5-tris[3(N,N-dimethylamino)propyl]- 1,3,5-triazine and POLYCAT®-43 is proprietary. The additive was nitromethane. POLYCAT®-41 catalyst was added to the B-side in an amount of 0.7 gram/100 grams polyol. The co-catalyst POLYCAT®-43 was added to the B-side in an amount of 2.1 grams/100 grams polyol. The additive, dissolved in the HCFC-141b blowing agent, was added in an amount of 0.5 gram/100 grams polyol. The analysis for HCFC-1131a is shown in Table XIII below.

EXAMPLE 24

The same polyurethane modified polyisocyanurate foam as in Example 23 was prepared except the PHT4-DIOL® additive described above was used. The additive was added to the B-side of the formulation in an amount of 5.3 grams/100 grams polyol. The analysis for HCFC- 1131a is shown in Table XIII below.

EXAMPLE 25

The same polyurethane modified polyisocyanurate foam as in Example 1 was prepared except that in addition to the use of the DABCO® TMR® catalyst described above, nitromethane was added. The catalyst was added in an amount of 3 grams/100 grams polyol and the additive was added in an amount of 0.5 gram/100 grams polyol. The analysis for HCFC-1131a is shown in Table XIII below.

EXAMPLE 26

The same polyurethane modified polyisocyanurate foam as in Example 23 was prepared except that Polyester Polyol A was used and the additive was nitromethane. The additive, dissolved in HCFC-141b, was added in an amount of 0.5 gram/100 grams polyol. The analysis for HCFC-1131a is shown in Table XIII below.

EXAMPLE 27

The same polyurethane modified polyisocyanurate foam as in Example 23 was prepared except that Polyester Polyol D was used. The analysis for HCFC- 1131a is shown in Table XIII below.

EXAMPLE 28

The same polyurethane modified polyisocyanurate foam as in Example 25 was prepared except that Polyester Polyol C was used. The analysis for HCFC- 1131a is shown in Table XIII below.

The data in Table XIII demonstrate the effectiveness of the presence of selected catalyst with additive in lowering the concentration of HCFC-1131a formed in polyurethane modified polyisocyanurate foams blown with HCFC-141b.

TABLE XIII

| EX | POLY-ESTER POLYOL | CATALYST | ADDITIVE (g/100 grams polyol) | $\mu$g 1131a / g 141b |
|---|---|---|---|---|
| 20 | B | TMR ® | PHT4-DIOL ®(5.3) | 397 |
| 21 | B | TMR-2 ® | CBr$_4$(2.5) | 329 |
| 22 | B | TMR-4 ® | CH$_3$NO$_2$(0.5) | 187 |
| 23 | B | POLY-CAT ® 41 & 43 | CH$_3$NO$_2$(0.5) | 95 |
| 24 | B | POLY-CAT ® 41 & 43 | PHT4-DIOL ®(5.3) | 269 |
| 25 | A | TMR ® | CH$_3$NO$_2$(0.5) | 291 |
| 26 | A | POLY-CAT ® 41 & 43 | CH$_3$NO$_2$(0.5) | 95 |
| 27 | D | POLY-CAT ® 41 & 43 | CH$_3$NO$_2$(0.5) | 59 |
| 28 | C | TMR ® | CH$_3$NO$_2$(0.5) | 262 |

Having described the invention in detail and by reference to preferred embodiments thereof, it will be apparent that modifications and variations are possible without departing from the scope of the invention defined in the appended claims.

What is claimed is:

1. A composition comprising polyisocyanate, polyol, a blowing agent which consists essentially of a hydrohalocarbon blowing agent surfactant, and catalyst for polymerization of said polyisocyanate and said polyol wherein said catalyst is selected from the group consisting of hydroxyalkylammonium carboxylates of the formula $$R_1R_2R_3N^{\oplus}-(\underset{R_5}{\overset{R_4}{C}})_n-OH \; X^-$$

where $n \geq 2$; $R_1$, $R_2$, $R_3$, $R_4$, and $R_5$ are the same or different and selected from hydrogen or alkyl having 1 to 18 carbon atoms; and $X^-$ is $R_6CO_2^-$ where $R_6$ is $$R_7-\underset{R_9}{\overset{R_8}{C}}-$$

where $R_7$, $R_8$, and $R_9$ are the same or different and selected from hydrogen, bromine, chlorine, alkyl having 1 to 18 carbon atoms, or substituted alkyl or alkoxy having 2 to 18 carbon atoms of the formula $$-(O)_a-CH_2-CR_{10}R_{11}Cl$$

where $R_{10}$ and $R_{11}$ are the same or different and selected from hydrogen, bromine, chlorine, aryl, or alkyl having 1 to 8 carbons and a is 0 or 1 and N-substituted triazines of the formula $$C_3H_6N_3-[(R_{12}R_{13}C)_nNR_{14}R_{15}]_3$$

where $n \geq 2$; $R_{12}$ and $R_3$ are the same or different and selected from hydrogen or alkyl having 1 to 18 carbon atoms; and $R_{14}$ and $R_{15}$ are the same or different and selected from alkyl having 1 to 18 carbon atoms, cycloalkyl having 1 to 18 carbon atoms, or aryl having 1 to 18 carbon atoms.

2. The composition of claim 1 wherein said catalyst is hydroxyalkylammonium carboxylates.

3. The composition of claim 1 wherein said catalyst is selected from the group consisting of hydroxyalkylammonium carboxylates of the formula $R_1R_2R_3N^+-CHR_4CHR_5OH\ X^-$ where $R_1$, $R_2$, $R_3$, $R_4$, and $R_5$ are the same or different and selected from the group consisting of hydrogen and alkyl having 1 to 18 carbon atoms; and $X^-$ is $R_6CO_2^-$ where $R_6$ is $$R_7-\underset{\underset{R_9}{|}}{\overset{\overset{R_8}{|}}{C}}-$$

where $R_7$, $R_8$, and $R_9$ are the same or different and selected from hydrogen, bromine, chlorine, alkyl having 1 to 18 carbon atoms, or substituted alkyl or alkoxy having 2 to 18 carbon atoms of the formula $-(O)_a-CH_2-CR_{10}R_{11}Cl$ where $R_{10}$ and $R_{11}$ are the same or different and selected from hydrogen, bromine, chlorine, aryl, or alkyl having 1 to 8 carbons and a is 0 or 1.

4. The composition of claim 1 wherein said catalyst is N-2-hydroxypropyltrimethylammonium formate.

5. The composition of claim 1 wherein said catalyst is hexahydro-1,3,5-tris[3(N,N-dimethylamino)propyl]-1,3,5-triazine.

6. A process for preparing polyurethane modified polyisocyanurate foam comprising the step of:
reacting polyol with polyisocyanate in the presence of a blowing agent which consists essentially of a hydrohalocarbon blowing agent, surfactant, and catalyst for polymerization of said polyol and said polyisocyanate wherein said catalyst is selected from the group consisting of hydroxyalkylammonium carboxylates of the formula $$R_1R_2R_3N^{\oplus}-\underset{\underset{R_5}{|}}{\overset{\overset{R_4}{|}}{(C)}}_n-OH\ X^-$$

where $n \geq 2$; $R_1$, $R_2$, $R_3$, $R_4$, and $R_5$ are the same or different and selected from hydrogen or alkyl having 1 to 18 carbon atoms; and $X^-$ is $R_6CO_2^-$ where $R_6$ is $$R_7-\underset{\underset{R_9}{|}}{\overset{\overset{R_8}{|}}{C}}-$$

where $R_7$, $R_8$, and $R_9$ are the same or different and selected from hydrogen, bromine, chlorine, alkyl having 1 to 18 carbon atoms, or substituted alkyl or alkoxy having 2 to 18 carbon atoms of the formula $$-(O)_a-CH_2-CR_{10}R_{11}Cl$$

where $R_{10}$ and $R_{11}$ are the same or different and selected from hydrogen, bromine, chlorine, aryl, or alkyl having 1 to 8 carbons and a is 0 or 1 and substituted triazines of the formula $$C_3H_6N_3-[(R_{12}R_{13}C)_nNR_{14}R_{15}]_3$$

where $n \geq 2$; $R_{12}$ and $R_{13}$ are the same or different and selected from hydrogen and alkyl having 1 to 18 carbon atoms; and $R_{14}$ and $R_{15}$ are the same or different and selected from alkyl having 1 to 18 carbon atoms, cycloalkyl having 1 to 18 carbon atoms, or aryl having 1 to 18 carbon atoms.

7. The composition of claim 6 wherein said catalyst is selected from the group consisting of hydroxyalkylammonium carboxylates of the formula $R_1R_2R_3N^+-CHR_4CHR_5OH\ X^-$ where $R_1$, $R_2$, $R_3$, $R_4$, and $R_5$ are the same or different and selected from the group consisting of hydrogen and alkyl having 1 to 18 carbon atoms; and $X^-$ is $R_6CO_2^-$ where $R_6$ is $$R_7-\underset{\underset{R_9}{|}}{\overset{\overset{R_8}{|}}{C}}-$$

where $R_7$, $R_8$, and $R_9$ are the same or different and selected from hydrogen, bromine, chlorine, alkyl having 1 to 18 carbon atoms, or substituted alkyl or alkoxy having 2 to 18 carbon atoms of the formula $-(O)_a-CH_2-CR_{10}R_{11}Cl$ where $R_{10}$ and $R_{11}$ are the same or different and selected from hydrogen, bromine, chlorine, aryl, and alkyl having 1 to 8 carbons and a is 0 or 1.

8. The process of claim 6 wherein said catalyst is hydroxyalkylammonium carboxylate.

\* \* \* \* \*